Sept. 1, 1959 J. D. BERING 2,902,250
DRAIN VALVES
Filed July 25, 1955
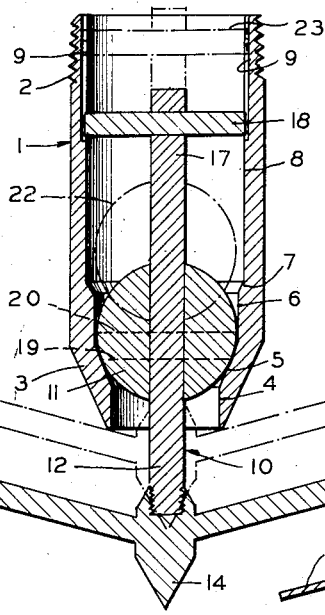
FIG_1
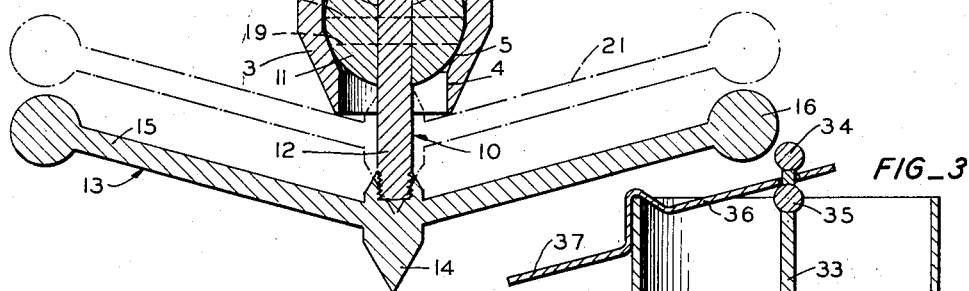
FIG_3
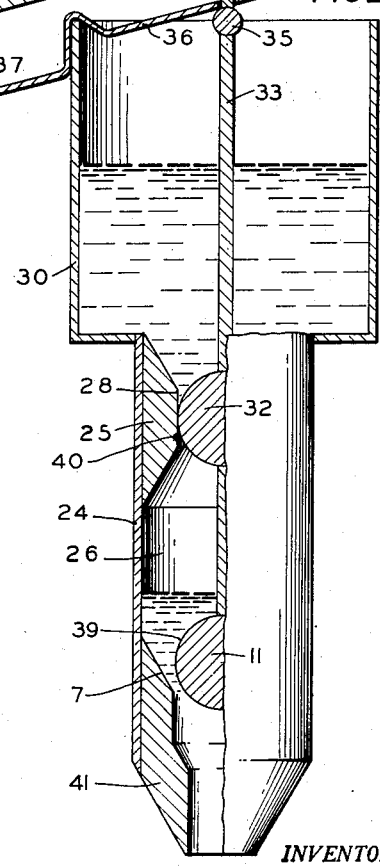
FIG_2
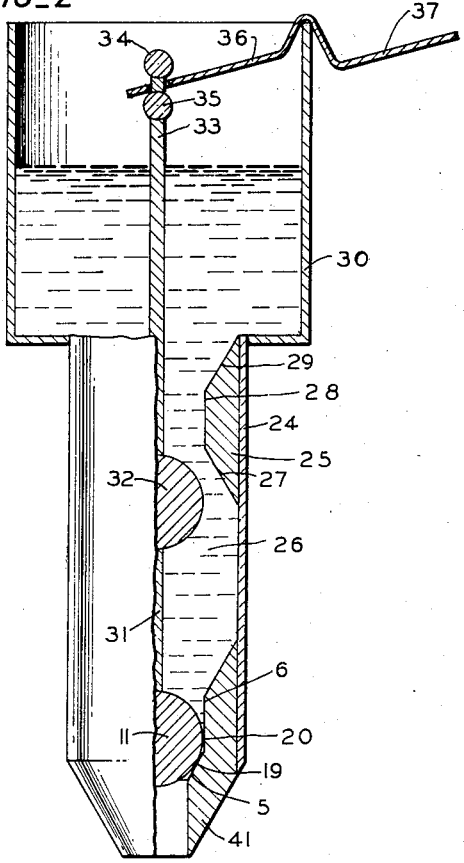
INVENTOR.
JORGEN DIETZ BERING
BY
ATTORNEY

United States Patent Office 2,902,250
Patented Sept. 1, 1959

2,902,250

DRAIN VALVES

Jorgen Dietz Bering, San Francisco, Calif.

Application July 25, 1955, Serial No. 524,144

3 Claims. (Cl. 251—120)

This invention relates to a drain valve for the control of the passage of a liquid either as a continuous stream or in the form of a measured volume. It is its principal object to perform this function in a sanitary fashion in the sense that the valve may readily be taken apart, cleaned and reassembled, and that the channel through which the liquid flows contains no crevices or corners in which it may accumulate in a stagnant fashion, or other contaminating factors such as exposure to materials that may affect it. Further elements of importance are simplicity and ruggedness of construction and operation, ease and quickness of action, great accuracy, close control of rate of flow, long wear and simple maintenance.

The principal operation features of this valve are seats of a special contour, a mobile stem section with one or two balls as seating member, and a non-rigid—or "fluid"—arrangement for the movement of this stem part.

The material for these seats and balls should be of considerable hardness and corrosive resistance; stainless steel of various types may be used.

Figure 1 shows the structure of the valve when designed for allowing a continuous stream passage of liquid.

Figures 2 and 3 show the valve when designed for releasing a measured volume of liquid.

On Figure 1 the seat 1 may include an exterior upper section 2 that is threaded so that it may be attached to the bottom of a container or to the end of a tube with a properly matching threaded part. The bottom exterior part 3 may be tapered to form an edged discharge opening.

The valve seat 1 is normally held in a vertical position and its interior contour includes these sections: A straight cylindrical vertical section 4 of a diameter somewhat less than that of the ball 11 (an example of dimensions used in a specific instance is given later); when moving upward an outward sloping cone section 5; a vertical cylindrical section 6 of a diameter that will allow the ball 11 to slide within it with capillary clearance, a term that will be defined more accurately later; an outward sloping cone section 7; and a vertical cylindrical section 8 of a diameter somewhat larger than the ball and adjusted to allow a passage of a desired rate of flow of liquid through the valve. Into the upper section of this vertical section 8 may be cut two vertical grooves 9 for the guidance of the guide pin 18.

The stem section includes a valve ball 11. If as in this case the stem section is moved by pushing from below a stem 12 extends downward from the ball 11. The lower end of the stem 12 may be threaded and equipped with a lifting assembly 13 consisting of a center nut 14 and lifter rods 15 that may carry small end balls 16 so that the valve lends itself readily to discharge into a cup. The stem part 17 extends upward from the ball 11 and carries the guide pin 18.

The stem section 10, as drawn in solid line, shows it when the valve is in closed position. Any flow of liquid is blocked by two linear and circular states of contact between the valve ball 11 and the seat 1, namely, along the circle 19 as the ball rests on the sloping seat section 5, and along the circle 20 as the vertical section 6 touches the ball 11 in tangential fashion within a clearing that has been reduced to what I shall term capillary clearance.

It is an important feature of my invention that I have found it possible to reduce this clearance between the valve ball and a tubular section to the state of capillary clearance at which the physical forces such as surface tension, adhesion and cohesion are capable of preventing the passage of liquid while it is still possible to move the ball freely provided the ball is moved in a "fluid" fashion defined by the absence of rigidity beyond that caused by contact between the ball and cylindrical section of the seat. This blocking of liquid passage may not be complete, but sufficient to limit it to what may be termed seepage, or when the hydrostatic pressure has been reduced substantially. This rate of seepage may amount to a drop every few seconds which is of no material effect upon the accuracy of a measured volume during the relatively short period the valve is opened whenever the valve is used as a measuring device as it will be described later.

Furthermore it is my finding that if this effect of capillary blocking of the liquid around the tangential circle 20 is combined with the gravitational blocking effect along the circle 19 as the valve ball rests on the sloped seat section 4, then a complete and permanent liquid closure results.

The opening of the valve is done by lifting the valve ball 11 above the seat sections 5 and 6, and may be performed either by pulling it from above or by pushing it from below. The latter procedure is used on Figure 1 and may be activated by pushing the edge of a vessel such as a cup up against the lifter arms 15 and moving them up to position 21. The broken line shows the stem sector in lifted position. The ball 11 has been moved up to the position 22 so that liquid may pass in the clearance between the ball and the vertical seat section 8. Thus the rate of flow of liquid through the valve can be controlled with considerable accuracy through the proper selection of the diameter of this seat section 8. Furthermore, as the liquid will flow around the ball and tend to pour along the stem a smoothly moving stream of minimum turbulence and spreading is produced.

The closing of the valve is produced by releasing the lifting force and allowing the ball 11 to return to its resting position on the sloping seat section 4.

The movement of the stem section is performed in a "fluid" fashion in the sense that the only rigidity imposed upon it is that of the tangential circle of contact 20 between the ball 11 and the vertical seat section 6. As in the case of the just described lifting of the stem section by means of a cup pressing against the lifter arms it may be found convenient to restrict this upward movement to one of a generally vertical nature. This may be attained by adding the upward reaching stem section 17 and equipping it with a guide pin 18 that moves in the vertical grooves 9 in the upper part of the vertical seat section 8. To retain the proper fluid movement of the ball 11 through the vertical seat section 6 it is essential that these grooves 9 are sufficiently wide to form a "sloppy" fit for the pin 18 and so assure that no binding position occurs during its travel to its upper position 23.

It will be noted that the structure of the valve conforms with the applicable standards for sanitary operation as they prevail within the various food industries.

By the threaded section 2 on the outside of the valve seat 1 the valve may be disconnected from the vessel to which it is attached. The nut 14 and the male thread on the end of stem section 12 permit the removal of the lifter assembly 13 from the stem sector whereupon it becomes possible to remove the entire stem sector from the seat. Thus all parts are left open for cleaning and inspection. Furthermore, the structure of the various parts do not give rise to the formation of any crevices in which foreign materials could accumulate. Finally the entire device lends itself to execution in materials, such as certain types of stainless steel, of both corrosion resistance and sufficient hardness to provide infinite wear.

In an operating execution of this valve as shown on Figure 1 these specifications were found useful: A stainless steel (formula #304) ball of a diameter of ¾" for item 11; the diameter of seat section 4 was 9/16"; of the cylindrical seat section 6, .752"; of seat section 6, .800"; the vertical dimensions of these sections 4, 6 and 8 were respectively 3/16", ¼", and 7/16". The sloping seat sections 5 and 7 were defined by their inclusive angles of 45° and 60°, respectively. The outside diameter of the seat was 1" and the slope of the bottom section 3 was of an inclusive angle of 60°. The valve stem was made of 3/16" rod; the guide pin of ⅛" rod, and the grooves 9 were 3/16" wide. All material was stainless steel, most of formula #302.

As to the accuracy of these dimensions, the diameter of the ball was held within .0001". The diameter of the cylindrical seat section 6, determining the capillary clearance, was held within .0005". For the other dimensions the accuracy of average machining operation was found sufficient.

The selected diameter of .752" for the vertical seat section 6 providing a radial clearance of .0001" has been found suitable for both "capillary" liquid blocking and easy movement of the ball in case of water and dilute solutions. For liquids of greater viscosity a slightly large clearance may be used. The radial clearance should, however, not exceed .004" above which the closure in most cases becomes ineffective and the seepage excessive.

Figures 2 and 3 show my invention when the valve is adapted to discharge a measured volume of liquid. Figure 2 shows the valve in a closed position while Figure 3 illustrates its position when the measured volume is being discharged.

The lower section of the valve consists of a closing seat 41 similar to the seat shown in Figure 1 except that the sloping cone section 7 extends to the outside of the seat. The valve seat 41 is pressed liquid-tight into the tubing 24 which at its upper end is attached to the bottom of the container 30 that holds the liquid to be discharged through the valve. The upper section of the tubing 24 contains a passing seat 25 which consists of three sections, namely an inward sloping cone section 27, a vertical cylindrical section 28 of a diameter that permits the ball 32 to pass with capillary clearance, and an outward sloping section 29.

In a similar fashion to that shown on Figure 1 the valve stem member includes a ball 11 that in closing position rests on the sloping seat section 5 and provides liquid blocking along the two tangential circles 19 and 20. In this case the stem 31 extends upward from the ball 11 to the upper ball 32 which is placed sufficiently below the sloping section 27 of the passing seat 25 to provide ample clearance for liquid flow from the vessel 23 into the valve chamber 26. Furthermore, the upper ball 32 is so placed that it closes in tangential fashion against the lower edge of the vertical section 28 when the valve stem member has been lifted exactly enough to move the lower ball 11 beyond the vertical seat section 6. Thus the length of the stem section 31 is equal to the vertical distance between the cylindrical seat sections 6 and 25 less the sum of the radii of the balls 11 and 32. The vertical extent of the clearance, in the closed position of the valve, between the ball 32 and the top of the sloping seat section 27 is approximately equal to the length of the cylindrical section 6 of the lower closing seat.

When the valve stem member is moved further upward, as shown on Figure 3, the upper ball 32 is brought into the position 40 in which it causes capillary liquid blocking against the seat section 28 of the passing seat 25. At the same time the lower ball 11 has been lifted into the position 39 and sufficiently above the sloping seat section 7 to allow adequate liquid passage for discharge of the measured volume held in the valve chamber 26. This clearance is related to the length of the cylindrical section 28 of the upper passing seat 25. The measured volume of liquid thus discharged can be determined with great accuracy by the proper selection of the diameter of the tube 24 and the distance between the lower closing seat 41 and the upper passing seat 25 at either end of the tube 24. After the measured volume of liquid has been discharged the valve is returned to its closed position by relieving the force that lifts the valve stem member so that it drops by gravity into the position shown in Figure 2.

The lifting of the valve stem member may be done either by pushing from below or by pulling from above. In any case it must be performed in a fluid fashion in the sense that the valve stem member at any time must be exposed only to the rigidity produced by one ball moving with capillary clearance within a seat section. This effect is attained (a) by the proper selection of the length of the stem section 31 between the balls 11 and 32, and (b) by the proper fluid structure of the lifting arrangement.

The fluid lifting arrangement—as shown on Figures 2 and 3 and which is to be taken as one of various possible arrangements—consists of these parts: A stem section 33 extending upward from the ball 32 and reaching above the liquid level in the container 30; two spaced balls 34 and 35 near the upper end of the stem 33 and between them the ring 37 which is part of the lifter arm 36. The spacing between the balls 34 and 35 and the orifice of the ring 37 is dimensioned to assure the free and non-rigid lifting of the valve stem assembly. The lifter arm 36 is bent to provide a handle section outside the container 30 and a limited movement as it rides over the edge of the container and of sufficient magnitude to cause the lifting of the valve stem member from the closed position shown in Figure 2 to the discharge position in Figure 3.

The specifications for an operating example of this type of measuring valve are as follows: The measured volume of discharge is in this instance predetermined as one-half fluid ounce. The dimensions for the closing seat 41 are the same as these given for the execution of the seat 1 in Figure 1 in regard to sloping sections 3, 5 and 7 and for the vertical seat sections 4 and 6. The straight section 28 of the passing seat 25 is of a diameter of .752" and ½" long; the included angles of the sloping seat sections 27 and 29 are both 60°. The outside diameter of both the closing seat 41 and the passing seat 25 is machined to make a press fit into the tubing 24 of an outside diameter of 1¼" and a wall thickness of 18 gauge. The balls 11 and 32 were both of a diameter of ¾", and the length of the stem section between them was ⅞". The final accuracy in regard to the volume of the measured discharge from the valve is obtained by pressing the bottom seat 41 into the tubing 24 until testing of the discharge volume shows the correct magnitude. An accuracy well within 1% may be reached in this fashion.

The measuring valve as shown in Figures 2 and 3 uses a combination of a closing seat 41 and a passing seat 25 placed in the lower and the upper end of valve chamber respectively. This arrangement would conform with a desire for positive closure by the closing seat and the instant removal of the stem member from the valve through the passing seat. The passing seat, however, will tend to cause seepage that may be of no importance if the valve is only held in discharging position for a relatively short period of time. If such seepage should be found objectionable both seats may take the form of closing seats. Altogether the combination of passing seats and closing seats may be varied to meet specific conditions.

In general it will be noted that the valve stem parts referred to as balls, and on the drawings as items 11 and 32, do not necessarily have to take the form of complete balls. It is only the sections encompassing the circles of contact with the seats, such as 19 and 20 on Figure 1, that must be of a spherical nature as ball sectors and of a diameter as determined by the relationship to the dimensions of the seats.

Having thus described my invention, I claim:

1. A liquid drain valve comprising a ball, and a seat with a lower vertical cylindrical section of a diameter of no more than eight thousandths of an inch in excess of that of the ball and which downward adjoins an inward sloping cone section, and which upward adjoins an outward sloping cone section that upward adjoins an upper vertical cylindrical section of a diameter sufficiently in excess of that of the ball to assure a predetermined rate of liquid flow through the valve, and facilities for lifting said ball from the lower cylindrical section into the upper cylindrical section and in a manner that excludes all rigidity except that imposed upon the movement by the lower cylindrical section of the seat.

2. A liquid valve comprising a fixed housing and a moveable valve member; said housing having an interior passage defined in part by a first cylindrical section, a second cylindrical section and a conical section; said first cylindrical section having a diameter substantially in excess of the diameter of said second cylindrical section and said conical section having a major diameter the same as the diameter of said second cylindrical section; said second cylindrical section and said conical section directly adjoining one another and both being formed of a rigid material; and said movable valve member having a rigid ball section with a diameter less than, and within .008 of an inch of, the diameter of said second cylindrical section and being moveable axially within said interior passage alternatively (1) to a closed position wherein the ball sector of said stem forms a line contact seal with said conical section and a line hydrostatic seal with said second cylindrical section and (2) to an open position wherein said ball sector is within said first cylindrical section and out of engagement with both said second cylindrical section and said conical section.

3. A liquid valve comprising a stem with a rigid ball sector and a seat with a vertical rigid cylindrical section with a diameter of no more than .008 of an inch in excess of that of the ball sector, and which downwardly adjoins an inwardly sloping rigid conical section, and which upwardly adjoins an outwardly sloping conical section which upwardly adjoins a housing section, substantial clearance being provided between said ball sector and said housing section whereby liquid may flow through the valve at a substantial rate when said ball sector has been lifted to an open position in said housing section and whereby the said ball rests on the lower inwardly sloping conical section in its closed position and forms two lines of sealing contact one against the lower conical section and the other against the adjoining vertical cylindrical section.

References Cited in the file of this patent

UNITED STATES PATENTS

| | | |
|---|---|---|
| 343,327 | Lowrie | June 8, 1886 |
| 645,706 | Grant | Mar. 20, 1900 |
| 1,011,797 | Howell | Dec. 12, 1911 |
| 1,859,479 | Thwaits | May 24, 1932 |
| 2,106,671 | Watson | Jan. 25, 1938 |
| 2,248,958 | Christensen et al. | July 15, 1941 |
| 2,262,169 | Crowley | Nov. 11, 1941 |
| 2,788,027 | Ullman et al. | Apr. 9, 1957 |

FOREIGN PATENTS

| | | |
|---|---|---|
| 439,381 | Germany | Jan. 11, 1927 |